United States Patent [19]
Mail

[11] Patent Number: 5,129,462
[45] Date of Patent: Jul. 14, 1992

[54] TURF HANDLING MACHINE

[76] Inventor: Stuart P. Mail, "Lothlorien" Lake Road, Deepcut, Camberley, Surrey, Great Britain, GU16 6QY

[21] Appl. No.: 591,080

[22] Filed: Oct. 1, 1990

[30] Foreign Application Priority Data

| Sep. 29, 1989 | [GB] | United Kingdom | 8922014 |
| Oct. 10, 1989 | [GB] | United Kingdom | 8922808 |
| Feb. 14, 1990 | [GB] | United Kingdom | 9003377 |
| Jul. 24, 1990 | [GB] | United Kingdom | 9016195 |

[51] Int. Cl.$^5$ .................. A01B 45/04; B65H 16/06
[52] U.S. Cl. .................. 172/19; 414/911; 111/901; 242/86.52
[58] Field of Search ........... 172/19, 20; 414/911, 414/24.6; 47/9 M, 56, 9; 111/901, 902; 242/86.52, 55.1, 66, 86.5 R

[56] References Cited

U.S. PATENT DOCUMENTS

| 2,977,058 | 3/1961 | Hornstein et al. | 242/55.1 |
| 3,235,011 | 2/1966 | Pasinski et al. | 172/19 |
| 3,982,711 | 9/1976 | Bradley et al. | 172/19 |
| 4,084,763 | 4/1978 | Zamboni | 414/911 |
| 4,088,069 | 5/1978 | Soteropulos | 242/86.5 R |
| 4,095,706 | 6/1978 | Schwien et al. | 414/911 |
| 4,149,640 | 4/1979 | White | 111/901 |
| 4,195,958 | 4/1980 | Vahlkamp et al. | 414/24.6 |
| 4,221,268 | 9/1980 | Freese et al. | 172/818 |
| 4,360,167 | 11/1982 | Beccalori et al. | 242/86.5 R |
| 4,428,707 | 1/1984 | Cockle et al. | 414/24.6 |
| 4,762,291 | 8/1988 | Sauber | 414/911 |
| 4,777,890 | 10/1988 | Raymond | 172/19 |
| 4,878,542 | 11/1989 | Brouwer et al. | 172/20 |
| 4,890,801 | 1/1990 | Brouwer et al. | 172/20 |
| 4,903,778 | 2/1990 | Brouwer et al. | 172/19 |
| 4,944,352 | 7/1990 | Brouwer et al. | 172/19 |
| 4,982,658 | 1/1991 | Knudson | 414/24.6 |

FOREIGN PATENT DOCUMENTS

| 153103 | 8/1985 | European Pat. Off. | 172/19 |
| 195760 | 9/1986 | European Pat. Off. | 47/914 |
| 221745 | 5/1987 | European Pat. Off. | 172/19 |
| 2371868 | 7/1978 | France | 414/24.6 |
| 2574244 | 6/1986 | France | 414/24.6 |
| 990100 | 1/1983 | U.S.S.R. | 172/19 |
| 2189123 | 10/1987 | United Kingdom | 414/24.6 |

Primary Examiner—Randolph A. Reese
Assistant Examiner—Spencer Warnick
Attorney, Agent, or Firm—Merchant, Gould, Smith, Edell, Welter & Schmidt

[57] ABSTRACT

A turf handling machine includes a chassis and a turf carrying apparatus mounted to the chassis for carrying a roll of turf. The roll of turf having an axial width and a circumferential surface. The chassis is mounted to two continuous driving tracks. The driving tracks normally drive the chassis in a forward direction over a ground surface upon which the turf is to be laid at a driving speed. A turf conveying apparatus is positioned on the chassis below the turf carrying apparatus. The turf conveying apparatus is arranged to contact a substantial portion of the circumferential surface of the roll of turf so as to cause the roll to be unwound and conveying the turf toward the ground surface behind the driving tracks when driven. The conveying of the turf is automatically synchronized with the driving speed so that the turf is laid at the driving speed.

18 Claims, 6 Drawing Sheets

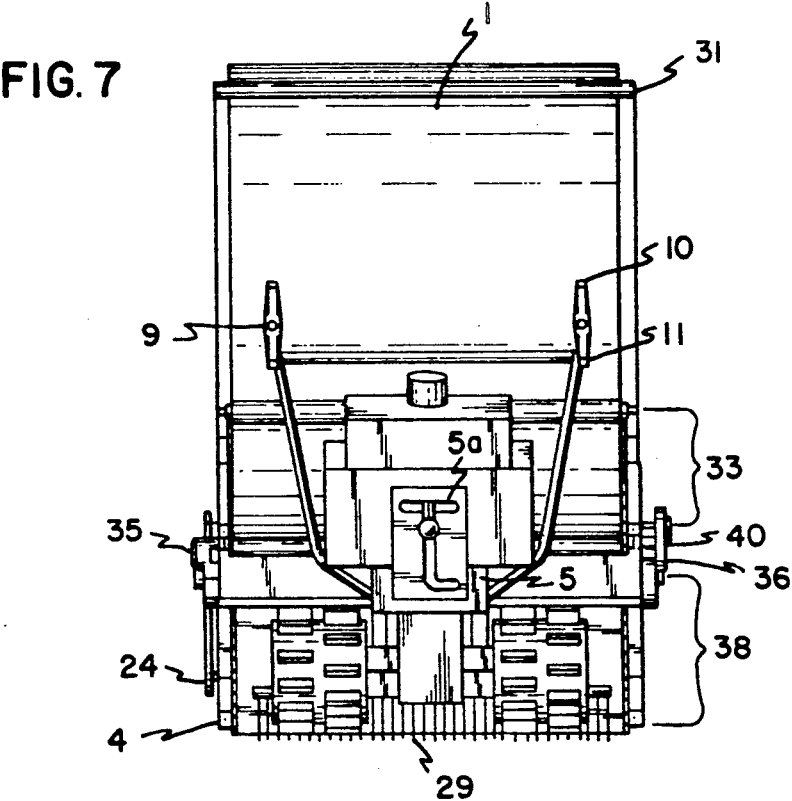
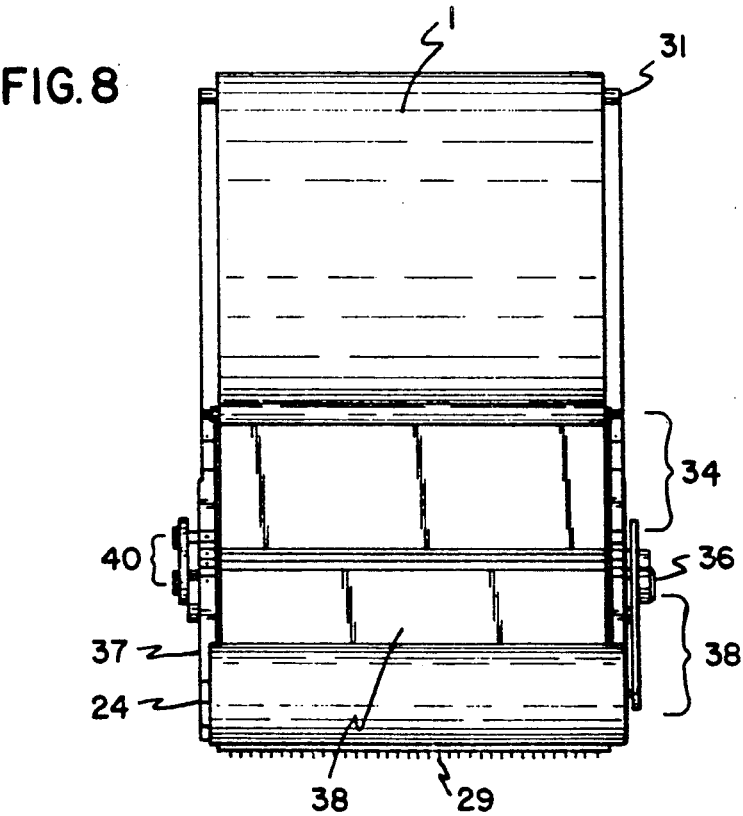

TURF HANDLING MACHINE

This invention relates to a machine for laying turf and more particularly to such a machine which serves for both laying and cutting turf.

Turf is typically harvested and rolled in small rolls (approx. 1 sq. yd.) by harvesting machines such as, for example, the machine disclosed in EP-A-0221745, and is transported to the site where turf is to be laid where it is laid manually. This laying process is time consuming and labour intensive, and hence turf laying machines for laying large rolls of turf have been proposed. Examples of these are disclosed in AU-B-77328/81 and EP-A-0178081. The former describes a turf cutting and laying machine which, when laying turf, is in the form of a frame which is attached to a suitably modified tractor, and which frame is towed therebehind. Turf is laid behind the tractor by unrolling a roll of turf contained in the frame. This is not desirable as the tracks created by the tractor are substantial, and compress the earth. This causes the laid turf to be uneven and disrupts the previously prepared ground on which the turf is to be laid.

EP-A-0178081 discloses a machine which carries a roll of turf on a frame at its front and which is unwound by means of a control roller. This roller rotates against the exterior of a turf roll to cause it to rotate and hence unwind. This approach is flawed, as the control roller is too small to be able to propel the heavy turf and may instead cut through the turf. Also the fact that the machine drives over the turf as it is laid creates the possibility that any weaknesses in the turf, which are commonplace, will be subjected to unnecessary stress and may cause the turf strip to break.

It is, thus an object of the present invention to provide a machine which will lay adjoining, or at least adjacent, pre-cut strips of turf (sods) to form a substantially even covering of turf on a predetermined prepared area of ground. It is also an object to provide a machine of such type which can also be used to cut strips of turf for this purpose.

According to the present invention there is provided apparatus for laying turf comprising: (a) a self propelling chassis which carries a roll of turf, (b) means for rotating said roll of turf thereby to unwind said turf onto a surface on which said turf is to be laid and (c) means for synchronising the rotation of said roll with the speed of travel of said chassis.

A machine in accordance with the invention is a self-propelled vehicle comprising a chassis that generally is to run on tracks or rollers and can be steered. It will lay a rolled strip of grass or other turf mounted upon, and carried by, the machine. The rolled strip of grass or other turf may be carried by a bobbin or spindle in the form of a shaft or drum having retaining plates or discs at its opposite ends. It may have splines, notches, slots, or may be otherwise drivably connectable to a powered drive mechanism mounted upon the machine. The machine includes a mechanism or apparatus to drive a roll of turf at a speed of rotation which is automatically continuously synchronized with the speed of travel of the machine over the ground so that, at any instant, the speed of drive of the roll of turf is substantially matched to the speed of travel of the machine over the ground. The synchronization mechanism or apparatus may have a manually, or otherwise, set tolerance to allow a variation in speed of drive with the speed of travel according to turf and/or ground conditions.

A machine in accordance with the invention may have a mounting or supporting frame that is located at the top thereof and upon which a roll of turf that is to be laid is rotatably supported by a bobbin or spindle. Means may be provided by which a supported roll of turf can be driven independently of the speed of movement of the machine over the ground so that one end of the roll of turf can be fed to an output mechanism of the machine whilst that machine is stationary relative to its surroundings. A mechanism may be provided by which both full rolls of turf, and empty spindles or bobbins, can be loaded onto, and removed from, the machine. This mechanism may be a winch, lifting frame or other means. A motor, that is preferably but not essentially an internal combustion engine, is provided together with gearing that will provide at least one forward and at least one reverse speed of drive to ground-engaging wheels, tracks or rollers. A roller may be provided which will press the turf strip into engagement with the ground as the turf is fed outwardly from a guide mechanism of the machine. An oscillating rake, rotating cultivator or other mechanism may be mounted on the vehicle to remove and/or repair any marks, footprints or the like that either the vehicle itself or its operator may make during a turf laying operation. A pivotally mounted plate, lever or the like may be provided to measure continuously the amount of turf remaining on any roll and to supply this information in a form in which it can be read mechanically or electronically by a drive synchronization unit of the machine, so that the speed at which turf is supplied for laying on the ground at any instant will always substantially match the speed of travel of the machine itself over the ground at the same instant. Means may be provided by which the laying mechanism can be lowered into operative engagement with the ground or be moved upwardly entirely out of engagement with the ground. Indicating means may be provided to enable an operator manually to follow a string or like guide, or the edge of a previously laid strip of turf. Such indicating mechanism may be constructed for linking to the steering mechanism of the machine so as substantially automatically to control that steering mechanism whereby the machine will automatically, or semi-automatically, follow a guide or the edge of a previously laid strip of turf. By supplying the strip of turf down a flat or convex chute, conveyor or ramp, abutting parallel strips of turf are laid which when contacted by a pressure roller flatten out and make intimate edge-to-edge contact.

The machine may engage the ground by way of two fore and aft rollers steerably interconnected by an articulation arrangement. This would enable the machine to perform a rolling action at the same time as it lays turf, thus often making one subsequent operation unnecessary. Such an arrangement is particularly suitable when flat areas of ground are to be dealt with.

For a better understanding of the invention, and to show how the same may be carried into effect, reference will now be made, by way of example only, to the accompanying drawings, in which:

FIG. 7 shows a view of the rear of the machine of FIG. 5;

FIG. 8 shows a view of the front of the machine of FIG. 5;

Figure 1:
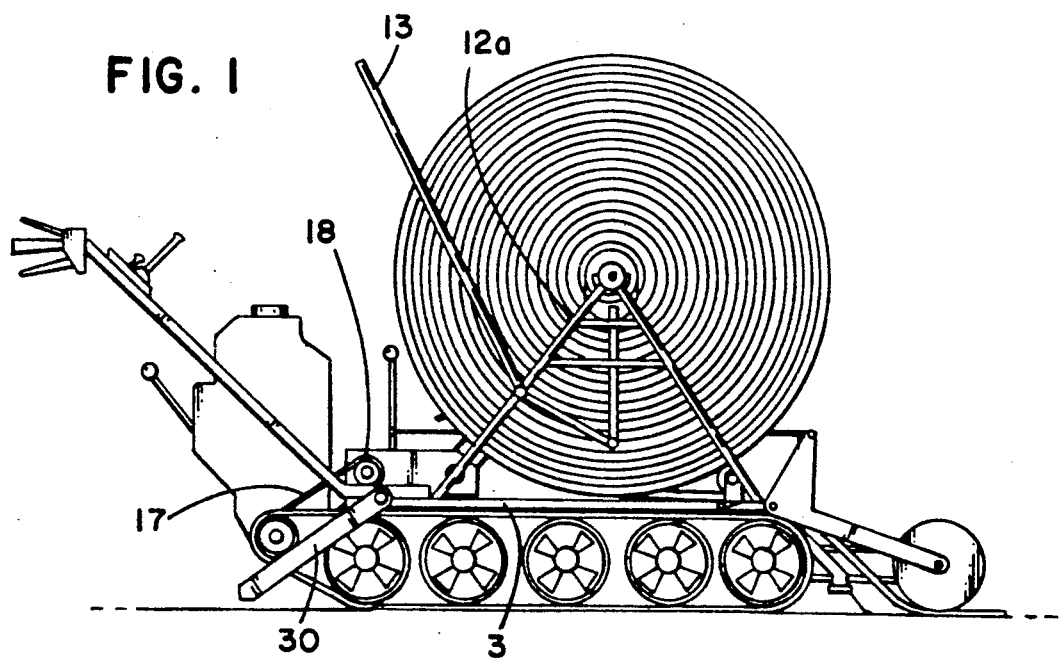
FIG. 1 shows a view of one side of a machine according to one embodiment of the invention.

Referring to the accompanying drawings, it is first noted that the expressions "rear" and "front" as applied to FIGS. 3, 4, 7 and 8 of the drawings assume that the machine will, in operation, be moved from right to left as seen in FIG. 1 with the pedestrian operator thereof at the front of the machine so that he/she does not walk on turf that has just been laid and the machine itself does not travel over such turf. However, it is noted that such a direction of operative travel is not essential and that there might be circumstances in which operative travel from left to right, as seen in FIG. 1, might be preferred.

The turf that is to be laid may be pre-cut into strips by any of several machines that are suitable for this purpose, including a suitably adapted machine in accordance with the invention, and is formed into a roll 1. Such a roll may be formed around a spindle or bobbin 2. The roll of turf may be typically between 750 and 1000 millimeters in width (to enable an overall machine width convenient for taking through side gates of homes to be constructed—see hereinafter), about 12.7 millimeters in thickness and between about 27.4 meters and 45.7 meters in length, depending upon whether the turf is heavy or light, a longer length of strip being satisfactory in the latter case. An example of heavy turf would be turf grown on clay in wet conditions, and light turf may be grown on peat in dry conditions. The turf is rolled soil-side outside.

Referring first to the embodiment shown in FIGS. 1 to 4, the machine is based on a sub-frame assembly 3 which is driven on steerable tracks 4 via a drive axle 6 from a motor, track gearbox and track drive assembly 5. The gearbox typically has two forward transit positions and one reverse laying position and is operated by means of a lever 5a.

The machine has a steering frame assembly 7 on which are mounted a turf roll drive lever 8, a throttle 9, a track drive engagement lever 10 and steering levers 11. As mentioned, the roll of turf 1 is wound on a spindle 2. This spindle is mounted on the machine on cradle bearings 12 on a support frame 12a mounted on the frame assembly 7. Mounted on the support frame 12a is a pivoted handle 13, and also a drive hub 14 which is connected to a turf roll drive unit 15 via a drive belt 16. The drive hub 14 is engaged with a splined end of the spindle 2 and thus causes the roll 1 to rotate when drive belt 16 is driven by the turf roll drive unit 15. The turf roll drive unit 15 is connected to the motor gearbox assembly 5 via a belt 17 extending between drive axle 6 and an input drive hub 18.

Rotation of the turf roll is synchronized to the speed of travel of the machine over the ground by the turf roll drive unit 15 through a system of mechanical, hydraulic or electrical gears. For mechanical operation, the unit 15 may comprise oppositely directed conical input and output members drivably interconnected by a belt or the like, the position of the latter being continuously governed axially of the two cones by the diameter of the turf roll at any instant. Provided that the cone angles are correct, the speed of movement of the strip 1a will change accurately to match the substantially constant speed of "laying" travel of the machine as the turf roll being dispensed progressively reduces in diameter. The speed of transit travel might typically be about 3.5 kilometers per hour, whereas the operative or laying speed might be about 1280 meters per hour.

It is preferable that the synchronization of turf laying with movement of the machine has a manually, or otherwise, set tolerance which allows adjustment of the laying speed according to turf and ground conditions. For example, it may be desirable to compress the turf as it is laid, and this may be achieved by increasing the speed at which the turf is rolled off the machine (as described hereinafter) relative to the speed of travel of the machine.

The turf roll rests on a spring-loaded turf roll follower plate 19 which is connected by a lever mechanism to transmit the turf roll diameter at any instant to the turf roll drive unit 15. The leading end of the turf strip 1a is fed around a toothed or knurled output drum 20 (FIG. 3), which drum is driven from a forward track wheel assembly by a belt connected to an output drive belt hub 21. The output drive belt hub 21 is connected by a further belt 22 to an output feeder drive hub 23. The output drive belt hub 21 also drives an output roller 24. The output roller 24 is carried on a pivotally mounted frame 25, which is connected to a control lever 26 through the intermediary of a link 27.

The machine also has an output chute 28 and an oscillating rake 29 both of which are attached to the sub-frame 3 at the rear of the machine. At the front of the machine are mounted guideline indicators 30.

In use, the required number of turf strips 1, rolled onto spindles or bobbins 2, is transported to the laying site and may be off-loaded onto frames or stands that will hold the complete rolls at a slightly greater height above the ground than cradle bearings 12 (FIG. 4) of the actual machine. If the rolls are loaded on frames, they are loaded onto the machine by driving the machine under one of the frames or stands holding a turf roll until its cradle bearings 12 are directly under the projecting ends of the spindle or bobbin 2 corresponding to that turf roll. The cradle bearings 12 are then lifted by operation of the pivoted handle 13 so that they raise the roll upwardly out of the frame or stand upon which it was resting. The machine is then backed out of the frame or stand. Alternatively, the rolls 2 may be loaded onto the cradle bearings 12 by means of lifting apparatus such as, for example, a crane or forklift. In any case, the handle 13 is lowered to move the cradle bearings 12 and the supported roll downwardly into an operating position resting on the support frame 12a. The machine is then placed in gear using a lever 5a. The machine then is positioned so that output roller 24 thereof is immediately above the point at which one end of the turf strip 1 is to lie, the machine being aligned in a reverse direction relative to the intended line along which the turf is to be laid.

The leading end of the turf strip 1a is fed around the output drum 20 (FIG. 3), down the output guide chute 28 and thence under the output roller 24 whilst all of these parts 20, 218 and 24 are in a raised position. The frame 25 supporting the drum 20 and the chute 28 is tne lowered to bring these parts into their operating position, i.e. when they are almost in contact with the ground. This is effected by operation of the control lever 26. Guide line indicators 30 are lowered to the positions shown in FIG. 4 of the drawings and the synchronized turf roll drive 15 is engaged by opoeration of lever 8.

Figure 10:
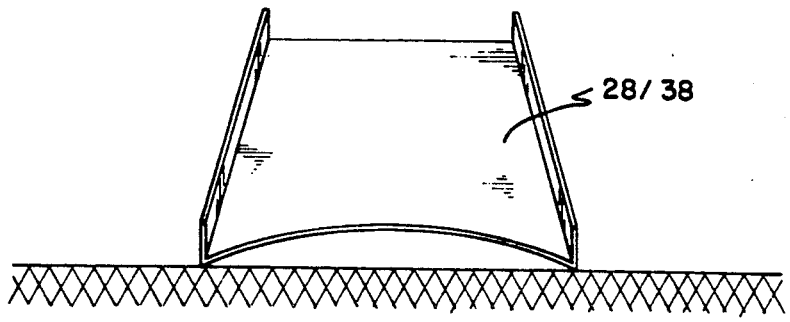
FIG. 10 shows a view of a preferred form of output discharge device of a machine embodying the invention.

Operation of the gear selector 5a, throttle 9, track drive engagement lever 10 and steering levers 11 then enables the machine to be driven in a reverse direction (from right to left as seen in FIG. 1 and as discussed above), the indicators 30 being used by the operator to follow a previously laid string line if a first strip is being laid, or the edtes of previously laid strips when later strips are subsequently being laid. The turf strip 1a is assisted down the output guide chute 28 by the output feeder drum 20. The output guide chute 28 is preferably convex in section, as shown in FIG. 10. This causes the turf to be laid with its centre portion slightly raised which, after laying, causes the turf to flatten thus pushing the edges of the turf outwards. This causes the turf to push against its neighbouring strip, thus creating a better abutment between turf strips, The turf strip is further assisted, and pressed onto the ground, by the output roller 24. The important function of the ground speed synchronization drive unit 15, the output roller 24 and the output feeder drive hub 23 is to remove the turf strip 1a progressively from the roll 1 at the correct speed at any given instant of operation and to place that strip 1a onto the ground without tearintg, stretching, splitting or otherwise damaging the strip 1a whish is of course, a delicate naturally produced article that will vary in consistency along its length due to features such as soil make up, dampness and the quality and nature of the particular grass which is growing on the strip.

It is to be noted that the tracks 4 are broad and thus spread the weight of the machine over an increased area. This minimizes the amount of compression of the prepared ground and assists the turf to grow once it is laid. Marks and depressions on the ground caused by the feet of the operator, and the machine tracks, are removed or repaired by the oscillating rake 29.

Figure 2:
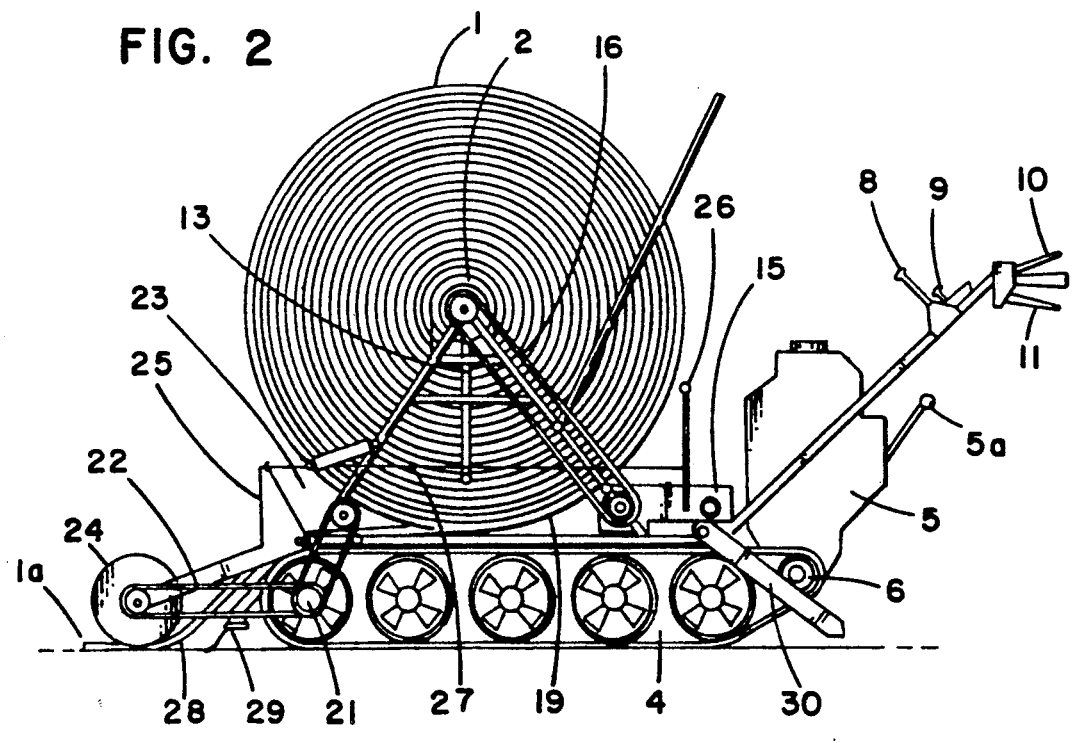
FIG. 2 shows a view of the other side of the machine of FIG. 1.
Figure 3:
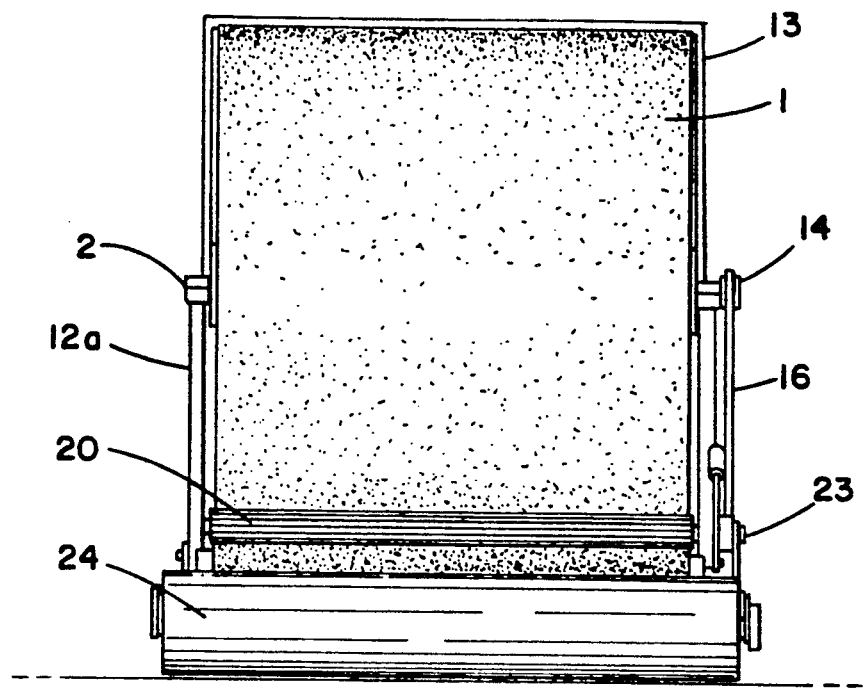
FIG. 3 shows a view of the rear end of the machine of FIG. 1.
Figure 4:
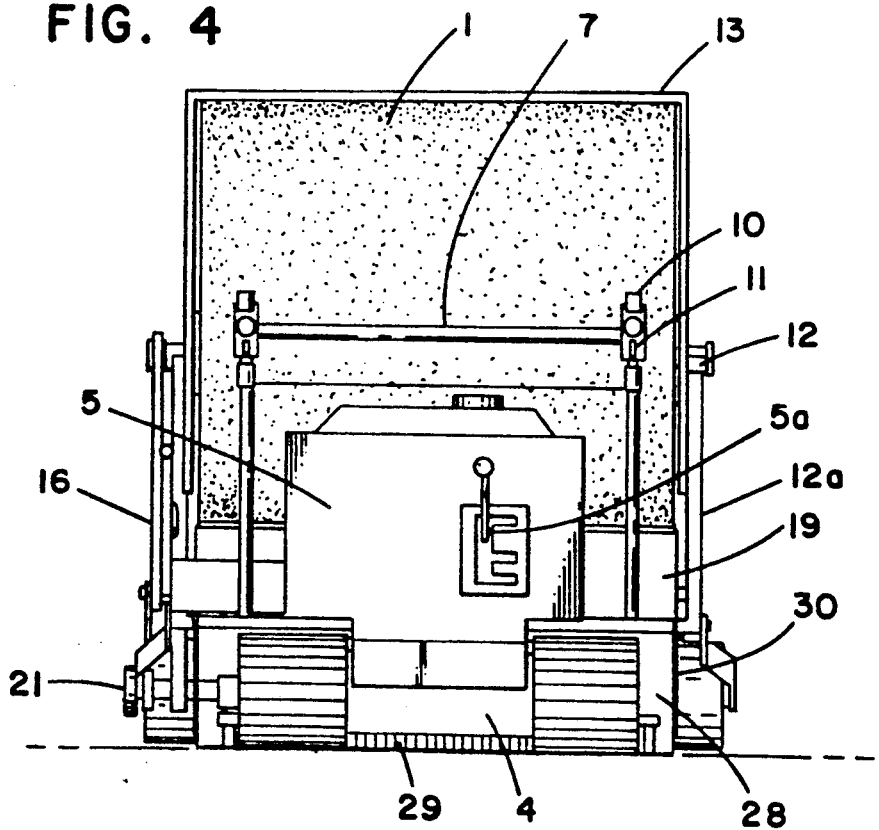
FIG. 4 shows a view of the front of the machine of FIG. 1.

On completion of laying a strip or when a roll 1 of turf has been used up, the machine is stopped and the synchronization drive 15 is disengaged. The output roller 24 is raised by the operation of the control lever 26 via the link 27 and frame 25 (FIG. 2). When the roll is not used up, the turf strip is then cut to match the required end of the areqa that has been turfed. The machine itself is then either turned around and the next strip laid in the same manner as has been described above alongside the first strip, or the machine may be driven back to a point adjacent to the original starting point and the second or next strip may be laid in the same direction alongside the first or previous strip.

Whe a first roll 1 is exhausted and the machine is therefore empty, the lever 26 is operated to raise the output roller 29 clear of the ground and the indicators 30 are also raised. The machine is then driven back to the point where the next turf roll and its spindle or bobbin 2 are waiting either on a lifting means or upon another frame or stand. The operation that has been briefly described is then repeated and this repetition may be effected as many times as is required to cover the complete area that is to be turfed.

For operation of the above described machine in the opposite direction, as briefly discussed earlier in this specification, a turf strip from the roll 1 carried by the machine is directed to the right from said roll, as seen in FIG. 1, to move around the output roller 24 which, under these circumstances, will be at the leading end of the machine. The output chute 28 may be raised, or be temporarily removed, for such operation.

FIGs. 5 to 8 illustrate a second embodiment of the invention (in which like reference numerals to those used in FIGS. 1 to 4 indicate like parts), which utilizes the cut turf arranged in a roll and wrapped around a spindle or bobbin as in the above described embodiment but in which the spindle or bobbin is not involved in driving the roll, but merely in loading of the roll onto the machine (as described above). When loaded, the roll 2 lies on top of a main roll conveyor 32 between a front roll conveyor 33 and a rear roll conveyor 34.

The main conveyor 32 is driven by a pinion, driven in turn by a power take-off shaft 36 from the turf roll drive assembly 15. In contrast to the first embodiment, in which the roll 2 is driven from the centre threreof and hence, in order to synchronize the speed of issue of turf with the speed of travel of the machine, the spped of driving the roll must be altered as the diameter of the roll decreases, in the second embodiment the roll is driven from its periphery by means of the above-mentioned conveyors 32 to 34. Because the periphery is driven, the speed of travel of the machine need only be synchronized to the speed of the conveyors. This is effected by means of gearbox 39. Numeral 35 indicates a pinion which holds the main conveyor 32 in place.

Laying is effected by means of the conveyors and after laying,the turf is rolled by output roller 24 (FIG. 5) which is , in this case, driven in clockwise rotation by belt 22 supported by a pivotally mounted frame. The belt 22 is driven by rotation of the main conveyor 32.

The turf 1a that it sot be laid passes over a turf guide conveyor 38 which may have a convex cross section (as shown in FIG. 10) to ensure accurate abutment of adjacent turf strips as described above with reference to output chute 18, and which is driven by rotation of the main conveyor 32. Lift cradle 31 is lowered by means of lift fram 37 (which parts are similar in function to handle 26 and cranks 25 of the first emboiment) to enable the turf 1a from the roll 1 to be pressed onto the ground by the roller 24 as that turf 1a is laid. Cog wheels and chains 40 (FIGS. 7 and 8) extend between the previously mentioned power take-off shaft 36 and the also previously mentioned rear roll conveyor 33 to transmit drive to the latter.

Operation of the gear lever or selector 5a, the throttle 9, and the clutch controls 10 enable the machine to be driven in a reverse direction (as discussed above), the roll 1 being rotated at a synchronized speed by the main conveyor 32, the rear roll conveyor 33 and the front roll conveyor 34. Since these conveyors constantly contact the exterior surface of the roll 1, the speed of issue fo the turf 1a beng laid from the roll 1 will match the substantially constant speed of "laying" travel of the machine as the roll 1 being dispensed progressively reduces in diameter, provided that the speed of the conveyors is synchronzied with the speed of the tracks.

The speed of non-laying transit tavel might typically be about 6 kilometers per hour whereas the operative or laying speed might be between about 0.6 and 1.37 kilometers per hour. As before, when laying has been completed, the roll 1 is cut to match the required location of that end.

Figure 5:
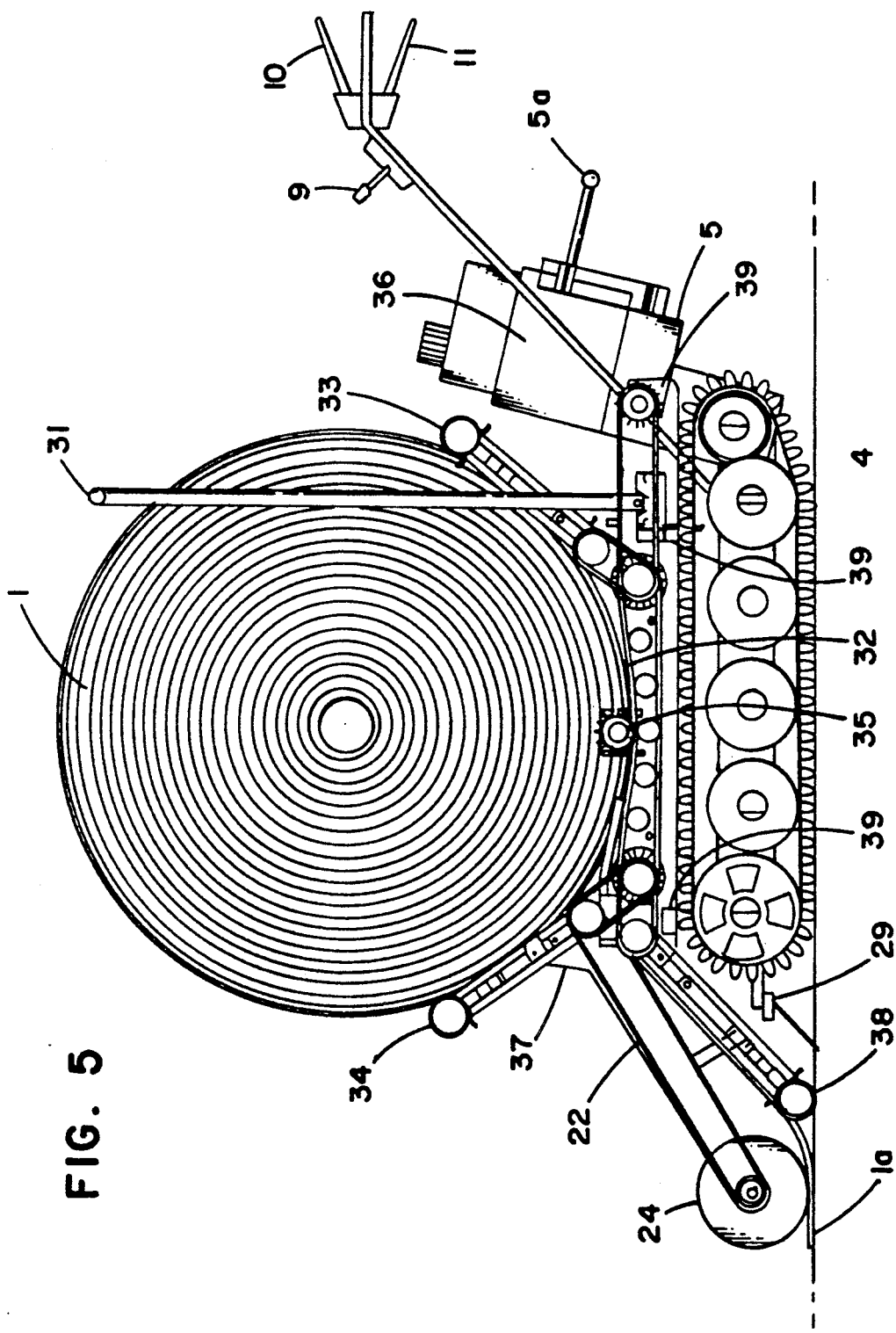
FIG. 5 shows a view of one side of a machine according to a second embodiment of the invention.
Figure 6:
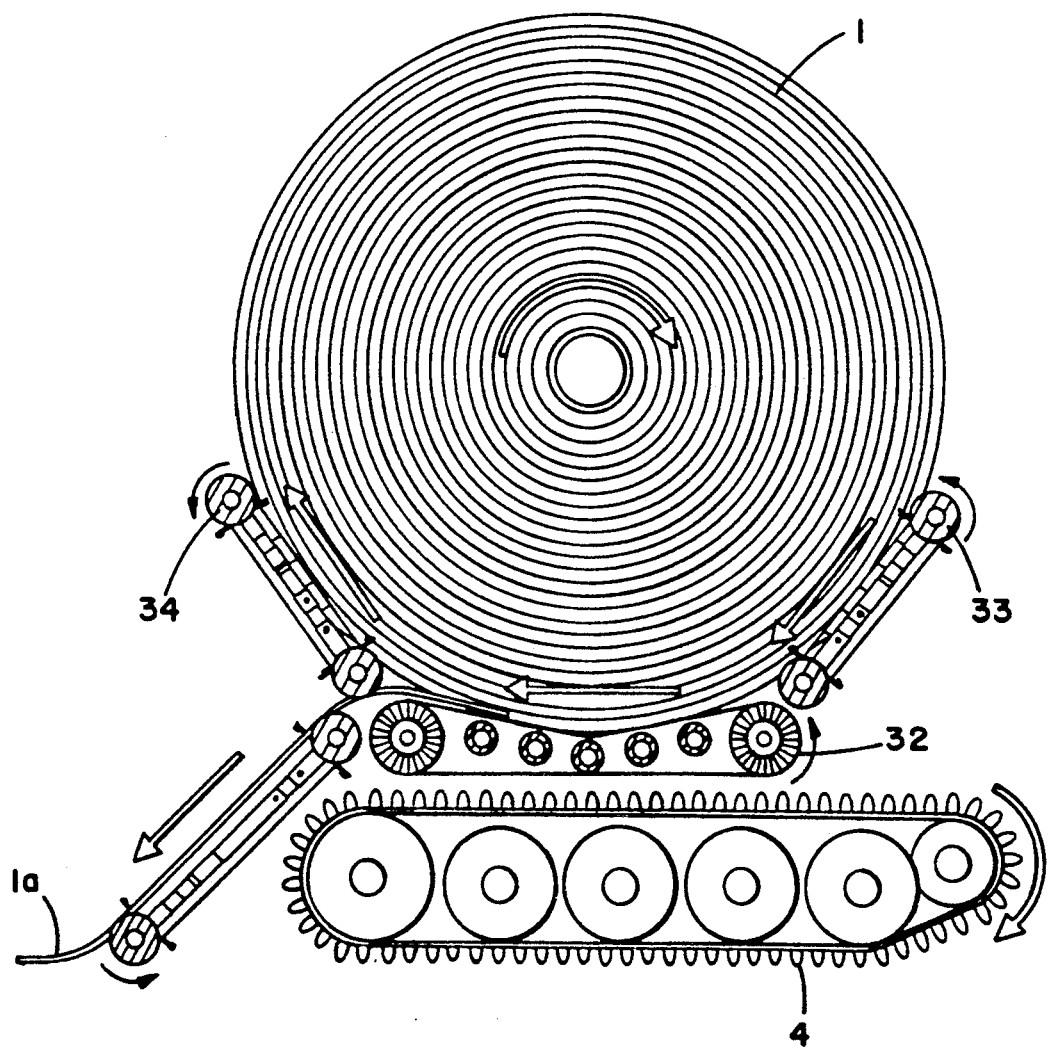
FIG. 6 shows a similar view to FIG. 5, to a somewhat enlarged scale, omitting some features but illustrating a laying operation in more detail.

It will be noted that the embodiment which has been described and which is illustrated in FIGS. 5 to 7 of the accompanying drawings, avoids the rolls 1 of turf being driven by the central spindle or the like. The drive to each roll 1 is effected on the external surface of that roll and no cental spindle or the like is employed for driving. As mentioned, the simplifies the way in which the speed of laying of the turf is automatically synchronized to the speed of travel of the machine.

Figure 9:
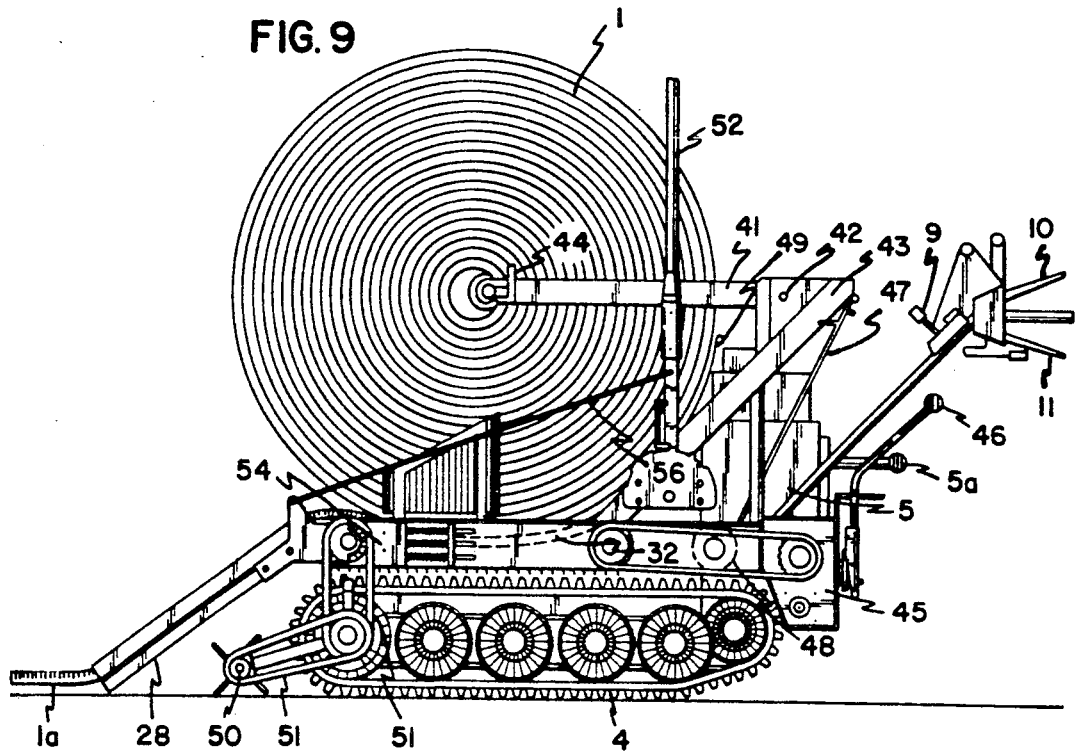
FIG. 9 shows a view of the side of a machine according to a third embodiment of the invention.

A third embodiment of the invention, illustrated in FIg. 9 utilizes the peripheral drive of the second embodiment, but includes a system for loading the roll onto the machine. In this embodiment, there is no output roller 24 and the output conveyor 38 is replaced by an output guide chute 28, which chute may be convex in cross section as described with reference to the first and second embodiments (see FIG. 10). The roll is pulled up the chute 258 by means of a winch system, the oepration of which is described below.

To load the turf roll 1 onto the machine, winch-cradle arms 41 are unclipped from pivot bearings 42 located on winch-frame 43 enabling them to be pulled out from the machine and attached by means of a latch 44 to spigots at either end of the spindle 2. The roll 1 is then pulled on to the machine by selecting a suitable gear in the windh and conveyor gearbox 45 by means of the winch/conveyor gear lever 46. The winch and conveyor gearbox 45 is located between the power take-off shaft 36 and main roll conveyor 32 and has three operating positions. These are "conveyor" (C)—this synchronizes the engine output to the track speed of the vehicle so that the main conveyor 32 drives turf off the machine at substantially the same speed as the vehicle is moving along the ground; "neutral" (N)—which disconnects the laying mechanism from the engine; and "winch" (W)—which connects the engine to the winch. The roll 1 is pulled or rolled up the guide chute 28 and onto the roll conveyor 32 by the winch winding the winch cable 47 onto the frum 48. Once in place, winch cardle arms 41 are refixed to pivot bearings 42 and act to hold the roll 1 on the machine. Cradle arms 41 are able to move radially by means fo the pivot bearings and hence will move downwards as the turf is laid and the diameter of the roll 1 decreases.

Side guide plates and rear slide plate 49 further act to maintain the position of the roll on the machine and alow the turf to alide off the machine as required.

A rotating cultivator 50 driven via drive chains 51 is provided to repair marks or depressions in the prepared soil upon which the turf 1 is to be laid. In transit, the front guide chute 28 is lifted off the ground by means of the lever 52 and cable 56.

As laying work commences, the machine is aligned in a reverse direction relative to the intended line along which that turf is to lie, the winch and conveyor gearbox is set to the "conveyor" positon and the engine is put in reverse gear. The engine now drives the tracks 4 and the roll conveyor 32 thereby rotating the roll 1 as the machine moves backwards as with the above described second embodiment. This is controlled by means of a track brake and steering control levers 11 as well as a throttle. The tension of the roll conveyor 32 is maintained by means of roll conveyor sliders 54 which are held by springs. These sliders allow the roll conveyor 32 to sag by a predetermined amount and to take on substantially the shape of the bottom of the roll 1 when it is loaded. This ensures that a maximum area of conveyor 32 is in contact with the roll 1, thereby providing maximum traction to drive the turf off the machine.

In any of the above-described emboeiments of the invention the machine can be employed to cut turf and to wind it into a roll, the described and illustrated output roller 24 merely needing replacement by a preferably adjustable turf cutting blade or knife and the thus modified machine needing to be operated from left to right for cutting purposes.

It is noted that the embodiments which have been described preferably have a width of substantially 1.2 meters, a length of substantially 2.2 meters and, when loaded, a height of substantially 1.2 meters. Such a width allows the machine to be driven through a garden gate or the like which is desirable if the area to be turfed is only accessible through for example a narrow passage or garage doorway. A turf roll has a weight of sustantially 500 kilograms and the machine itself has a weight of substantially 250 kilograms so that, when loaded at the beginning of an operation, the machine will have a weight of substantially 750 kilograms. Its ground loading, or pressure upon the ground, is approximately 197 grams per square centimeters and it is noted that this is more or less equivalent to the walking ground loading of an average man. It is also noted that the machine which is illustrated in the drawings and that have been described will be fitted with safety guards and shields but that these are completely omitted from said drawings for the sake of clarity.

I claim:

1. An apparatus for laying turf, the apparatus comprising:
    a chassis;
    turf carrying means mounted upon the chassis for carrying a roll of turf having an axial width and a circumferential surface;
    at least two continuous driving tracks upon which said chassis is mounted, said driving tracks driving said chassis in at least a forward direction over a ground surface upon which said turf is to be laid;
    an endless belt turf conveying means positioned on the chassis below said turf carrying means and being arranged to contact a substantial portion of said circumferential surface for causing said roll to be unwound and for conveying said turf toward said ground surface behind said driving tracks;
    driving means for driving said driving tracks to cause said apparatus to travel over said ground surface at a driving speed; and
    synchronizing means for synchronizing said conveying of said turf with said driving speed so that said turf is laid at said driving speed.

2. An apparatus as claimed in claim 1, wherein said turf carrying means comprises a shaft around which said roll of turf is wound.

3. An apparatus as claimed in claim 1, wherein said turf conveying means comprises at least one conveyor positioned to engage the circumferential surface of said roll.

4. An apparatus as claimed in claim 1, further comprising turf guiding means for guiding said turf from said turf conveying means to said ground surface behind said driving tracks.

5. An apparatus as claimed in claim 4, wherein said turf guiding means comprises a chute of a width at least equal to that of the roll of turf, the turf guiding means having a substantially convex profile across the width of the chute such that said turf includes a raised center portion when laid.

6. An apparatus as claimed in claim 5, wherein said chute is pivotally mounted to said chassis.

7. An apparatus as claimed in claim 1, wherein said driving means comprises an internal combustion engine and driving gears between said engine and said driving tracks providing at least one forward and one reverse gear to enable said tracks to be driven at least one forward and one reverse speed.

8. An apparatus as claimed in claim 1, wherein said synchronizing means comprises user operable adjusting means for enabling a user of the apparatus to adjust the speed of conveying said turf and said driving speed.

9. An apparatus as claimed in claim 1, wherein said synchronizing means comprises automatic adjusting means for automatically adjusting said speed of conveying said turf and said driving speed.

10. An apparatus as claimed in claim 9, wherein said automatic adjusting means is arranged to alter continually the speed of rotation of said drive means.

11. An apparatus as claimed in claim 1, further comprising a roller connected to the rear of said chassis for rolling said laid turf.

12. An apparatus as claimed in claim 1, further comprising repairing means connected to the rear of said chassis for repairing said ground surface immediately prior to the laying of said turf.

13. An apparatus as claimed in claim 12, wherein said repairing means comprises an oscillating rake.

14. An apparatus as claimed in claim 12, wherein said repairing means comprises a rotating cultivator.

15. An apparatus as claimed in claim 1, further comprising turf cutting means for cutting said turf.

16. An apparatus as claimed in claim 1, wherein said driving tracks are positioned to lie within the width of the roll of turf.

17. An apparatus for laying turf, the apparatus comprising:

a chassis;

turf carrying means mounted upon the chassis for carrying a roll of turf having an axial width and a circumferential surface;

at least two continuous driving tracks upon which said chassis is mounted, said driving tracks normally in use driving said chassis in a forward direction over a ground surface at which said turf is to be laid;

an endless belt turf conveying means positioned on the chassis below said turf carrying means, the turf conveying means being arranged to contact a substantial portion of said circumferential surface so as to cause said roll to be unwound and to convey said turf toward said ground surface behind said driving tracks; and driving means for driving said driving tracks to cause said apparatus to travel over said ground surface at a driving speed and for driving said turf conveying means, said conveying of said turf being synchronized with said driving speed so that said turf is laid at said driving speed.

18. A method of laying turf, the method comprising the steps of:

carrying a roll of turf having an axial width and a circumferential surface on a turf carrying means mounted upon a chassis;

driving said chassis by way of at least two continuous driving tracks upon which said chassis is mounted in a forward direction over a ground surface at a driving speed at which said turf is to be laid;

contacting a substantial portion of said circumferential surface of said roll of turf with an endless belt conveying means and thereby unwinding said roll and conveying said turf toward said ground surface behind said driving tracks; and synchronizing said conveying of said turf with said driving speed so that said turf is laid at said driving speed.

* * * * *

UNITED STATES PATENT AND TRADEMARK OFFICE
CERTIFICATE OF CORRECTION

PATENT NO. : 5,129,462                    Page 1 of 3

DATED : July 14, 1992

INVENTOR(S) : Stuart P. Mail

It is certified that error appears in the above-identified patent and that said Letters Patent is hereby corrected as shown below:

On the title page,
In [30], delete "8922014" and insert --8922014.9-- therefor; delete "8922808" and insert --8922808.4-- therefor; delete "9003377" and insert --903377.0-- therefor; and delete "9016195" and insert --9016195.1-- therefor.

In column 5, line 1, delete "218" and insert --28-- therefor.

In column 5, line 2, delete "tne" and insert --then-- therefor.

In column 5, line 8, delete "opoeration" and insert --operation-- therefor.

In column 5, line 16, delete "edtes" and insert --edges-- therefor.

In column 5, line 34, delete "whish" and insert --which-- therefor.

In column 5, line 52, delete "areqa" and insert --area-- therefor.

In column 5, line 59, delete "Whe" and insert --When-- therefor.

In column 6, line 9, delete "FIGs." and insert --FIGS.-- therefor.

UNITED STATES PATENT AND TRADEMARK OFFICE
CERTIFICATE OF CORRECTION

PATENT NO. : 5,129,462

DATED : July 14, 1992

INVENTOR(S) : Stuart P. Mail

It is certified that error appears in the above-identified patent and that said Letters Patent is hereby corrected as shown below:

In column 6, line 24, delete "spped" and insert --speed-- therefor.

In column 6, line 46, delete "emboiment" and insert --embodiment-- therefor.

In column 6, line 59, delete "fo" and insert --of-- therefor.

In column 6, line 65, delete "tavel" and insert --travel-- therefor.

In column 7, line 8, delete "cental" and insert --central-- therefor.

In column 7, line 9, delete "the" and insert --this-- therefor.

In column 7, line 13, delete "FIg." and insert --FIG.-- therefor.

In column 7, line 20, delete "258" and insert --28-- therefor.

In column 7, line 20, delete "oepration" and insert --operation-- therefor.

UNITED STATES PATENT AND TRADEMARK OFFICE
CERTIFICATE OF CORRECTION

PATENT NO. : 5,129,462     Page 3 of 3
DATED : July 14, 1992
INVENTOR(S) : Stuart P. Mail It is certified that error appears in the above-identified patent and that said Letters Patent is hereby corrected as shown below:

In column 7, line 28, delete "windh" and insert --winch-- therefor.

In column 7, line 41, delete "frum" and insert --drum-- therefor.

In column 7, line 44, delete "fo" and insert --of-- therefor.

In column 7, line 49, delete "alow" and insert --allow-- therefor; delete "alide" and insert --slide-- therefor.

In column 8, line 5, delete "emboeiments" and insert --embodiments-- therefor.

In column 8, line 25, delete "centimeters" and insert --centimeter-- therefor.

Signed and Sealed this

Seventh Day of December, 1993

Attest:

BRUCE LEHMAN

*Attesting Officer*     *Commissioner of Patents and Trademarks*